(12) United States Patent
Usa et al.

(10) Patent No.: US 6,833,969 B2
(45) Date of Patent: Dec. 21, 2004

(54) MASTER INFORMATION CARRIER FOR MAGNETIC TRANSFER

(75) Inventors: Toshihiro Usa, Kanagawa-ken (JP); Kazunori Komatsu, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 111 days.

(21) Appl. No.: 10/391,613

(22) Filed: Mar. 20, 2003

(65) Prior Publication Data

US 2003/0179477 A1 Sep. 25, 2003

(30) Foreign Application Priority Data

Mar. 20, 2002 (JP) ........................................ 2002-078679

(51) Int. Cl.[7] ................................................. G11B 5/86
(52) U.S. Cl. .............................. 360/17; 360/16; 360/15; 428/694 SG; 428/65.3
(58) Field of Search ............................. 360/15, 16, 17, 360/48; 428/694 SG, 65.3, 694 R

(56) References Cited

U.S. PATENT DOCUMENTS 6,347,016 B1    2/2002    Ishida et al.

FOREIGN PATENT DOCUMENTS

| EP | 0 915 456 A1 | 5/1999 |
|---|---|---|
| EP | 1 227 472 A2 | 7/2002 |
| EP | 1 260 969 A2 | 11/2002 |
| EP | 1 316 948 A2 | 6/2003 |
| EP | 1 320 088 A2 | 6/2003 |
| JP | 63-183623 | 7/1988 |

Primary Examiner—Sinh Tran
Assistant Examiner—Natalia Figueroa
(74) Attorney, Agent, or Firm—Sughrue Mion, PLLC

(57) ABSTRACT

A master information carrier for magnetic transfer has a concentric irregularity pattern representing information to be transferred to a disc-like magnetic recording medium. The top surface of the protruding portions of the irregularity pattern is formed of magnetic material. The irregularity pattern is formed so that the width L [nm] in a circumferential direction of a protruding portion at a distance R [nm] from the center satisfies the condition $$L = \alpha(\omega \cdot \Delta T \cdot R), \ 0.8 \leq \alpha \leq 1.4,$$

wherein $\omega$ represents in [rad/sec] the angular velocity of the magnetic recording medium when a signal is read out from the magnetic recording medium after the magnetic transfer and $\Delta T$ represents in [sec] a desired signal time width of a reproduction signal waveform in a magnetization transition region corresponding to an interval between the ends of the protruding portion in the circumferential direction.

3 Claims, 4 Drawing Sheets

MASTER INFORMATION CARRIER FOR MAGNETIC TRANSFER

BACKGROUND OF THE INVENTION

1. Field of the Invention

This invention relates to a master information carrier carrying thereon an irregularity pattern (a pattern of protruding portions and recessed portions) representing the information to be transferred to a magnetic medium.

2. Description of the Related Art

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc, a zip (a flexible disc available from Iomega) and the like. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At the present, such preformat recording is performed by the use of a specialized servo recording apparatus (a servo track writer). However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication No. 63(1988)-183623 and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, the magnetization pattern representing the information (e.g., servo information) carried by a master information carrier is magnetically transferred from the master information carrier to a slave medium by applying a transfer magnetic field to the slave medium and the master information in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

The master information carrier used in the magnetic transfer disclosed, for instance, in U.S. Pat. No. 6,347,016has an irregularity pattern (a pattern of protruding portions and recessed portions) representing information to be transferred to slave media and at least the top surface of the protruding portions of the irregularity pattern is formed of magnetic material. By magnetic transfer by the use of such a patterned master information carrier, a magnetization pattern corresponding to the irregularity pattern on the master information carrier is formed on the slave media.

In the magnetic transfer, the reproduction signal waveform obtained from the slave media to which the magnetization pattern is transferred from the master information carrier, that is, whether the reproduction signal waveform is of a desired amplitude and a desired period, is important.

Our, these inventor's, investigation has revealed that the reproduction signal waveform from a magnetic recording medium obtained by the magnetic transfer depends upon the shape of the protruding portions of the irregularity pattern on the master information carrier, the strength of the transfer magnetic field, the distance between the master information carrier and the slave medium (the degree of close contact therebetween), and the like. The amplitude of the reproduction signal waveform is related to the signal quality (S/N), and a certain strength of the transfer magnetic field is required and the distance between the master information carrier and the slave medium should be as small as possible in order to obtain a good signal quality. Various shapes of the protruding portions of the irregularity pattern on the master information carrier have been proposed in view of using conditions such as on close contact, separation and the like, manufacturing conditions, and/or the like. In any shape of the protruding portions, there is an effective width in the direction of the tracks. However, it has not been clear what effective width in the direction of the tracks provides desired periodicity to the reproduction signal waveform.

Unless the reproduction signal waveform has desired periodicity, the recording/reproducing accuracy of the magnetic recording medium is deteriorated. Especially, when the information to be transferred is a servo signal, the tracking performance deteriorate, which can result in deterioration of reliability.

SUMMARY OF THE INVENTION

In view of the foregoing observations and description, the primary object of the present invention is to provide a master information carrier which can form a magnetization pattern on a magnetic recording medium by magnetic transfer so that a desired reproduction signal waveform can be obtained from the magnetic recording medium.

In accordance with the present invention, there is provided a master information carrier for magnetic transfer having on the surface thereof a concentric irregularity pattern representing information to be transferred to a disc-like magnetic recording medium, at least the top surface of the protruding portions of the irregularity pattern being formed of magnetic material, wherein the improvement comprises that the irregularity pattern is formed so that the width L [nm] in a circumferential direction of a protruding portion at a distance R [nm] from the center satisfies the condition $$L = \alpha(\omega \cdot \Delta T \cdot R), \ 0.8 \leq \alpha \leq 1.4,$$

wherein $\omega$ represents in [rad/sec] the angular velocity of the magnetic recording medium when a signal is read out from the magnetic recording medium after the magnetic transfer and $\Delta T$ represents in [sec] a desired signal time width of a reproduction signal waveform in a magnetization transition region corresponding to an interval between the ends of the protruding portion in the circumferential direction.

That is, in the master information carrier for magnetic transfer of the present invention, the width L [nm] in a circumferential direction (in a direction of track) of a protruding portion is changed according to the radius of the track (the distance from the center) with the value of α selected to an optimal value within the range of 0.8 to 1.4 according to the conditions such as the shape of the protruding portion, the strength of the magnetic field applied upon magnetic transfer, the distance between the master information carrier and the magnetic recording medium (the degree of close contact therebetween) and/or the like, so that the signal time width of the reproduction waveform reproduced at an angular velocity of ω is of a desired value in all the tracks.

The "width in a circumferential direction of a protruding portion" as used here means an effective width affecting formation of the magnetization pattern (the width of the magnetized area) by the protruding portion. For example, when the cross-sectional shape of the protruding portion taken along a plane extending in a direction parallel to the direction of the track in perpendicular to the surface of the master information carrier (will be simply referred to as "the longitudinal cross-sectional shape", hereinbelow) is a rectangle or trapezoid, the effective width is the width in the direction of the track of the top surface of the protruding portion, whereas when the longitudinal cross-sectional shape of the protruding portion is a rectangle or trapezoid with its upper portions cut away at the ends thereof, the effective width is the distance between the intersections of the extension of the upper side of the rectangle or the trapezoid and the extensions of the end lines of the rectangle or the trapezoid.

In the master information carrier of the present invention where the width L [nm] in a circumferential direction of a protruding portion at a distance R [nm] from the center satisfies the aforesaid condition, the reproduction signal waveform obtained from the slave media to which the magnetization pattern is transferred from the master information carrier can be of a desired amplitude and a desired period. Especially, when the information to be transferred is a servo signal, the accuracy of the tracking servo is improved.

When $L/(\omega \cdot \Delta T \cdot R)(=\alpha)$ is smaller than 0.8, the longitudinal cross-sectional shape of the protruding portion must be a trapezoid having sufficiently inclined end lines in order to obtain desired periodicity of the reproduction signal, which makes it geometrically difficult to ensure a predetermined depth of recessed portion between protruding portions. Further when $L/(\omega \cdot \Delta T \cdot R)(=\alpha)$ is larger than 1.4, the applied magnetic field must be strengthened or the distance between the master information carrier and the slave medium must be enlarged in order to obtain desired periodicity of the reproduction signal. However when the distance between the master information carrier and the slave medium is enlarged, the amplitude of the reproduction signal greatly deteriorates, that is, the signal quality greatly deteriorates.

DESCRIPTION OF THE PREFERRED EMBODIMENTS

Figure 1:
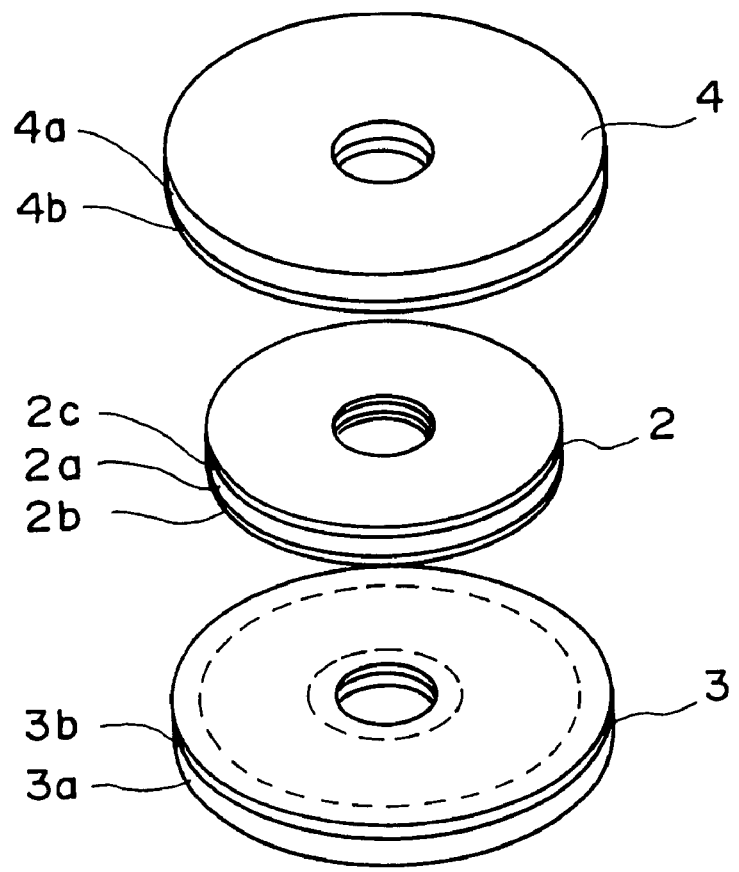
FIG. 1 is an exploded perspective view of a double-sided slave medium and a pair of master information carriers carrying thereon information to be transferred to opposite sides of the slave medium.

Magnetic transfer for transferring information on a master information carrier to a slave medium (magnetic recording medium) will be first described in brief. As shown in FIG. 1, a pair of pieces of information are transferred to opposite sides of a magnetic recording medium (slave medium) 2 from a pair of master information carriers 3 and 4.

The magnetic recording medium 2 is a disc-like magnetic recording medium such as a hard disc or a flexible disc and comprises a disc-like base sheet 2a and magnetic layers 2b and 2c formed on opposite sides of the base sheet 2a.

The master information carriers 3 and 4 comprise substrates 3a and 4a having irregularity patterns (e.g., servo signals) representing information to be transferred to the magnetic layers 2b and 2c of the magnetic recording medium 2 and soft magnetic layers 3b and 4b provided along the irregularity patterns on the base sheets 3a and 4a Though the magnetic recording medium 2 is away from the master information carriers 3 and 4 in FIG. 1, the magnetic layers 2b and 2c of the magnetic recording medium 2 are brought into close contact with the soft magnetic layers 3b and 4b of the master information carriers 3 and 4, or are opposed to the soft magnetic layers 3b and 4b of the master information carriers 3 and 4 in the vicinity thereof, when magnetic transfer is actually carried out.

Figure 2A:
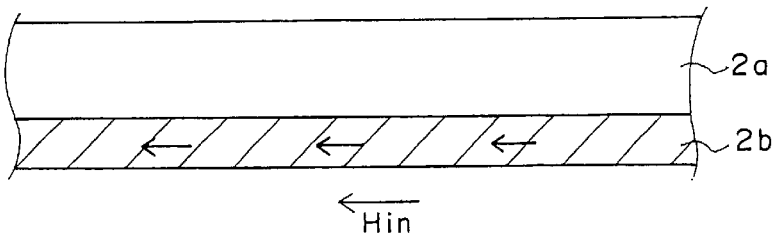
FIGS. 2A to 2C are views for illustrating basic steps of magnetic transfer.
Figure 2B:
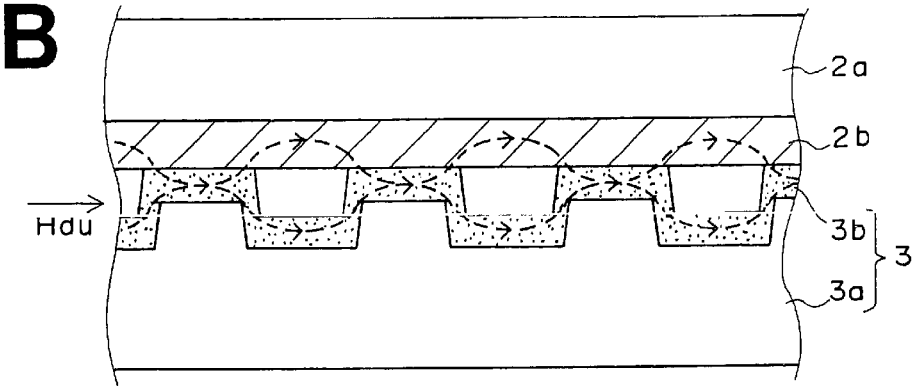
Figure 2C:
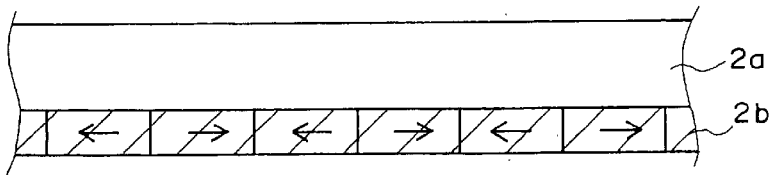

Basic steps of magnetic transfer of information to a slave medium (magnetic recording medium) will be described with reference to FIGS. 2A to 2C, hereinbelow. In FIGS. 2A to 2C, only the lower magnetic layer 2b is shown.

An initial DC magnetic field Hin is first applied to the slave medium 2 in one direction parallel to the recording tracks thereof, thereby magnetizing the magnetic layer 2b of the slave medium 2 in an initial DC magnetization as shown in FIG. 2A. Thereafter, the magnetic layer 3b of the lower master information carrier 3 is brought into close contact with the lower magnetic layer 2b of the slave medium 2. In this state, a transfer magnetic field Hdu is applied in the direction opposite to the initial DC magnetic field Hin as shown in FIG. 2B, thereby magnetically transferring the information on the master information carrier 3 to the lower magnetic layer 2b of the slave medium 2. As a result, information represented by the irregularity pattern on the master information carrier 3 (e.g., a servo signal) is transferred to the lower magnetic layer 2b as shown in FIG. 2C. The information represented by the irregularity patterns on a pair of master information carriers may be transferred to opposite sides of the slave medium either simultaneously or in sequence.

In the case where the irregularity pattern representing information to be transferred is a negative pattern reverse to the positive pattern shown in FIGS. 2A to 2C, the information can be magnetically transferred to the slave medium 2 by reversing the directions of the initial DC magnetic field Hin and the transfer magnetic field Hdu. The intensities of the initial magnetic field and the transfer magnetic field should be determined taking into account the coercive force of the slave medium 2, the specific permeabilities of the magnetic layers of the master information carrier 3 and the slave medium 2.

The master information carrier 3 in accordance with the present invention will be described in detail with reference to FIGS. 3, 4 and 5A to 5C, hereinbelow.

The master information carrier 3 of the present invention is provided on its surface with an irregularity pattern representing information to be transferred to a slave medium 2. The irregularity pattern is formed so that the width L [nm] in a circumferential direction of a protruding portion at a distance R [nm] from the center satisfies the condition $$L = \alpha(\omega \cdot \Delta T \cdot R), \ 0.8 \leq \alpha \leq 1.4,$$

wherein ω represents in [rad/sec] the angular velocity of the magnetic recording medium when a signal is read out from the magnetic recording medium after the magnetic transfer and ΔT represents in [sec] a desired signal time width of a reproduction signal waveform in a magnetization transition region corresponding to an interval between the ends of the protruding portion in the circumferential direction. The value of α is selected within the range of 0.8 to 1.4 so that the width L [nm] is such as to obtain a desired ΔT from a magnetic recording medium after magnetic transfer. The circumferential width M of the recessed portion is a value in proportion to (ω·ΔT·R) and the factor of proportionality is readily determined when the shape and the circumferential width L of the protruding portion are determined.

Figure 3:
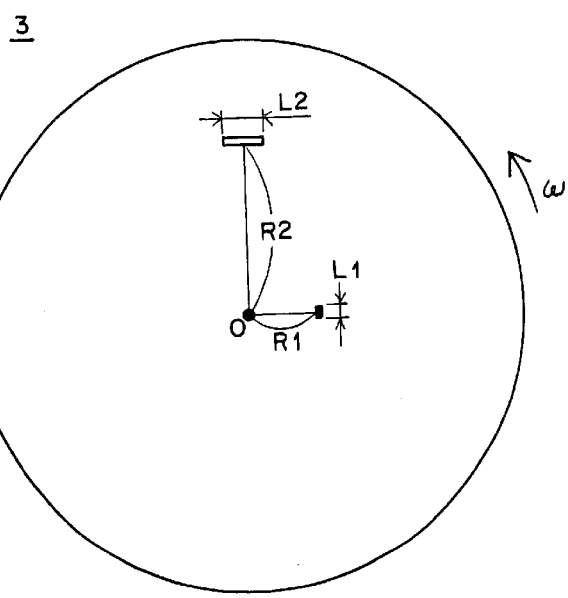
FIG. 3 is a plan view for illustrating a master information carrier in accordance with an embodiment of the present invention.

In the master information carrier 3 shown in FIG. 3, the circumferential width L1 of the protruding portion formed at a distance R1 from the center is α(ω·ΔT·R1) and the circumferential width L2 of the protruding portion formed at a distance R2 from the center is α(ω·ΔT·R2).

That is, when reading out a signal from a magnetic recording medium, a reproduction signal is generally obtained by detecting magnetization transition regions of a magnetization pattern while rotating the magnetic recording medium at a constant angular velocity. Accordingly, in order to obtain a predetermined reproduction signal waveform from a magnetic recording medium, it is necessary that the intervals between magnetization transition regions of the magnetization pattern are narrowed inward and broadened outward. In accordance with the present invention, the widths of the protruding portions and the recessed portions contributing to the intervals between magnetization transition regions are made to be larger as the radius of the concentric recording track is increased in order to make such intervals. Though, being illustrated as a rectangle in FIG. 3, the shape of the top surface of the protruding portion need not be limited to a rectangle but may be, for instance, a parallelogram or a trapezoid.

Figure 4:
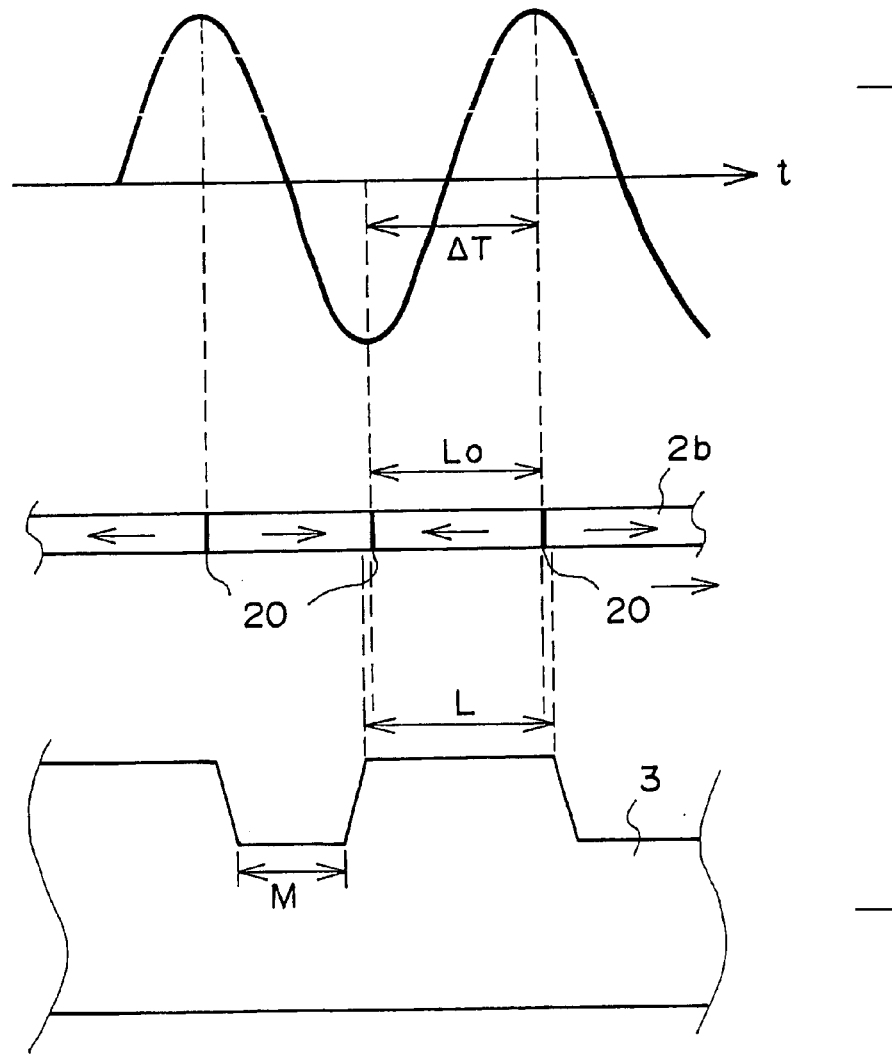
FIG. 4 is a view showing the relation between the reproduction signal waveform obtained from the magnetic recording medium, the magnetization pattern of the magnetic recording medium and the irregularity pattern on the master information carrier.

In order to obtain a desired ΔT in a reproduction signal shown in the part of FIG. 4 indicated at (a), it is necessary that the transition regions 20 of the magnetization pattern in the slave medium 2 is formed at intervals shown in the part of FIG. 4 indicated at (b). The intervals Lo between the transition regions 20 of the magnetization pattern in the slave medium 2 is ω·ΔT·R. Though the magnetization transition regions 20 in the slave medium 2 are formed according to the track direction widths (width in the track direction) of the protruding portions on the master information carrier 3, the intervals between the transition regions 20 of the magnetization pattern in the slave medium 2 do not necessarily coincide with the track direction width of the protruding portion on the master information carrier 3 but change with various factors such as the strength of the magnetic field applied upon magnetic transfer, the distance between the master information carrier and the magnetic recording medium (the degree of close contact therebetween), the shape of the protruding portion, and the like. Accordingly, with the track direction width L of the protruding portion taken as L=α·Lo, the value of α must be set. An optimal value of α is selected within the range of 0.8 to 1.4.

Such a master information carrier can be produced by producing a plurality of master information carriers different in α within the range of 0.8 to 1.4, carrying out magnetic transfer by the use of the master information carriers, and adopting the master information carrier from which a magnetic recording medium closest to a desired signal time width ΔT in signal time width is obtained as the master information carrier to be used in an actual magnetic transfer.

Figure 5A:
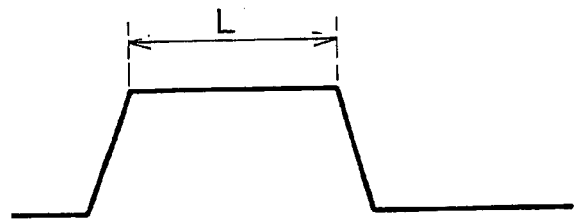
FIGS. 5A to 5C are views showing examples of the cross-sectional shape of the protruding portion on the master information carrier.
Figure 5B:
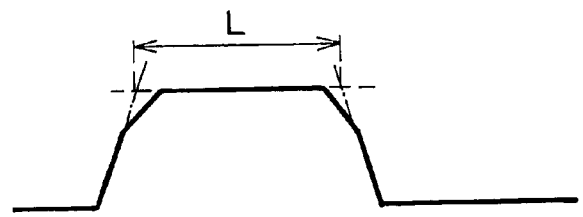
Figure 5C:
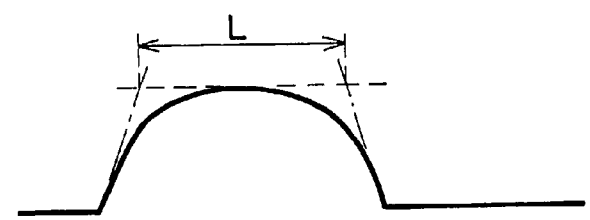

The shape of the protruding portions of the irregularity pattern on the master information carrier is varied according to using conditions such as on close contact, separation and the like, manufacturing conditions, and/or the like. The "width in a circumferential direction (track direction width) of a protruding portion" as used here means an effective width affecting formation of the magnetization pattern (the width of the magnetized area) by the protruding portion. For example, when the cross-sectional shape of the protruding portion taken along a plane extending in a direction parallel to the direction of the track in perpendicular to the surface of the master information carrier (will be simply referred to as "the longitudinal cross-sectional shape", hereinbelow) is a rectangle or trapezoid as shown in FIG. 5A, the track direction width L is the width in the direction of the track of the top surface of the protruding portion, whereas when the longitudinal cross-sectional shape of the protruding portion is a rectangle or trapezoid with its upper portions cut away at the ends thereof as shown in FIG. 5B, the track direction width L is the distance between the intersections of the extension of the upper side of the rectangle or the trapezoid and the extensions of the end lines of the rectangle or the trapezoid. Further, when the upper surface and the end surfaces of the protruding portion are curved as shown in FIG. 5C, the track direction width L of the protruding portion is the distance between the intersections of the tangents of the upper surface and the end surfaces of the protruding portion.

Though the value of the track direction width of the protruding portion optimal to obtain a predetermined reproduction signal waveform differs with the shape of the protruding portion, a master information carrier which can provide slave media from which reproduction signals of a predetermined waveform can be obtained can be produced by selecting the value of α from the range of 0.8 to 1.4.

The substrate of the master information carrier may be formed, for instance, of nickel, silicon, a quartz plate, glass, aluminum, ceramics or synthetic resin. The soft magnetic layer maybe formed, for instance, of Co, Co alloys (e.g., CoNi, CoNiZr and CoNbTaZr), Fe, Fe alloys (e.g., FeCo, FeCoNi, FeNiMo, FeAlSi, FeAl and FeTaN), Ni or Ni alloys (e.g., NiFe). As the material of the soft magnetic layer, FeCo and FeCoNi are especially preferable.

The substrate of the master information carrier having thereon the irregularity pattern or the pattern of the protruding portions can be formed, for instance, by the use of stamper method or photolithography.

For example, a photo-resist layer is first formed on a smooth glass plate (or a smooth crystal plate), for instance, by spin coating, and a laser beam (or an electron beam) modulated according to the servo signal is projected onto the photo-resist layer while rotating the glass plate so that the photo-resist layer is exposed to the laser beam in a predetermined pattern, e.g., a pattern of servo signals each extending in a radial direction in one track. Thereafter the photo-resist layer is developed and the part exposed to the laser beam is removed with an irregularity pattern of the photo-resist left on the glass plate, thereby obtaining a matrix. Then the surface of the matrix is plated (electroforming), and a Ni substrate having a positive irregularity pattern is formed on the matrix and separated from the matrix. The Ni substrate as it is may be used as a master information carrier or may be used as a master information carrier after forming a soft magnetic layer and a protective layer along the irregularity pattern as desired.

Otherwise, the matrix may be plated to form a second matrix and the second matrix may be plated to form a base sheet having a negative irregularity pattern. Further, a third matrix may be formed by plating the second matrix or pressing a resin syrup against the surface of the second matrix and curing the resin syrup, and a base sheet having a positive irregularity pattern may be formed by plating the third matrix.

Further, a matrix without photo-resist layer maybe first formed by etching the glass plate with an irregularity pattern of the photo-resist to make holes in the glass plate, and a base sheet may be formed by the use of the matrix in the manner described above.

The substrate may be formed of metal such as Ni or Ni alloy as described above, and as the aforesaid plating for forming the metal substrate, various metal film forming techniques such as electroless plating, electro forming, sputtering, and ion plating can be employed. The height of the protruding portion (the depth of the irregularity pattern) is preferably in the range of 50 to 800 nm and more preferably 80 to 600 nm. When the irregularity pattern represents sample servo signals, each of the protruding portions is rectangle having longer sides in a radial direction of the substrate and shorter sides in a circumferential direction of the same. When the irregularity pattern represents sample servo signals, each of the protruding portions is preferably 0.05 to 20 $\mu$m in the longer sides and 0.05 to 5 $\mu$m in the shorter sides.

The soft magnetic layer $3b$ may be formed on the irregularity pattern by various vacuum film forming techniques or plating method such as vacuum deposition, sputtering, ion plating and the like of magnetic material. The thickness of the soft magnetic layer $3b$ is preferably 50 to 500 nm and more preferably 80 to 300 nm.

It is preferred that a protective film such as of DLC (diamond-like carbon) be provided on the soft magnetic layer on the upper surface of the protruding portion. A lubricant layer may be further provided on the protective film. A reinforcement layer such as a Si layer may be provided between the soft magnetic layer and the protective film to enhance the contact therebetween. The lubricant layer suppresses deterioration in durability of the soft magnetic layer, such as scores due to friction, which occurs in correcting for a shift generated when the soft magnetic layer is brought into contact with the slave medium.

What is claimed is:

1. A master information carrier for magnetic transfer having on the surface thereof a concentric irregularity pattern representing information to be transferred to a disc-like magnetic recording medium, at least the top surface of the protruding portions of the irregularity pattern being formed of magnetic material, wherein the improvement comprises that the irregularity pattern is formed so that the width L [nm] in a circumferential direction of a protruding portion at a distance R [nm] from the center satisfies the condition $$L=\alpha(\omega \cdot \Delta T \cdot R), 0.8 \leq \alpha \leq 1.4,$$

wherein $\omega$ represents in [rad/sec] the angular velocity of the magnetic recording medium when a signal is read out from the magnetic recording medium after the magnetic transfer and $\Delta T$ represents in [sec] a desired signal time width of a reproduction signal waveform in a magnetization transition region corresponding to an interval between the ends of the protruding portion in the circumferential direction.

2. A master information carrier as defined in claim 1 in which the cross-sectional shape of the protruding portion taken along a plane extending in a direction parallel to the direction of the track in perpendicular to the surface of the master information carrier is a rectangle or trapezoid and the width in a circumferential direction of a protruding portion, is the width in the direction of the track of the top surface of the protruding portion.

3. A master information carrier as defined in claim 1 in which the cross-sectional shape of the protruding portion taken along a plane extending in a direction parallel to the direction of the track in perpendicular to the surface of the master information carrier is a rectangle or trapezoid with its upper portions cut away at the ends thereof, and the width in a circumferential direction of a protruding portion is the distance between the intersections of the extension of the upper side of the rectangle or the trapezoid and the extensions of the end lines of the rectangle or the trapezoid.

* * * * *